United States Patent
Tanizawa et al.

(10) Patent No.: US 8,507,027 B2
(45) Date of Patent: Aug. 13, 2013

(54) SEASONING COMPOSITIONS, SALT-LIKE TASTE ENHANCER AND METHOD FOR ENHANCING SALT-LIKE TASTE OF FOOD AND DRINK

(75) Inventors: Junko Tanizawa, Tokyo (JP); Yoshiya Fushimi, Yokohama (JP)

(73) Assignee: Japan Tobacco Inc., Tokyo (JP)

( * ) Notice: Subject to any disclaimer, the term of this patent is extended or adjusted under 35 U.S.C. 154(b) by 36 days.

(21) Appl. No.: 12/594,934

(22) PCT Filed: Mar. 26, 2008

(86) PCT No.: PCT/JP2008/055739
§ 371 (c)(1),
(2), (4) Date: Oct. 6, 2009

(87) PCT Pub. No.: WO2008/126678
PCT Pub. Date: Oct. 23, 2008

(65) Prior Publication Data
US 2010/0112186 A1    May 6, 2010

(30) Foreign Application Priority Data
Apr. 9, 2007    (JP) .................................. 2007-101965

(51) Int. Cl.
*A23J 1/00*    (2006.01)
(52) U.S. Cl.
USPC ............................. 426/656; 426/533; 426/804
(58) Field of Classification Search
None
See application file for complete search history.

(56) References Cited

U.S. PATENT DOCUMENTS

| | | | |
|---|---|---|---|
| 3,524,747 A | 8/1970 | O'Hara et al. | |
| 5,000,977 A | 3/1991 | Marggrander et al. | |
| 5,145,707 A | 9/1992 | Lee | |
| 2006/0115517 A1 * | 6/2006 | Tsuchiya et al. ............... | 424/439 |

FOREIGN PATENT DOCUMENTS

| | | |
|---|---|---|
| GB | 1 131 937 A | 10/1968 |
| JP | 57-138359 A | 8/1982 |
| JP | 63-3766 A | 1/1988 |
| JP | 63-137658 A | 6/1988 |
| JP | 5-184326 A | 7/1993 |
| JP | 6-87805 A | 3/1994 |
| JP | 7-289197 A | 11/1995 |
| JP | 10-66540 A | 3/1998 |
| JP | 11-187841 A | 7/1999 |
| JP | 2002-345430 A | 12/2002 |
| JP | 2004-275059 A | 10/2004 |
| JP | 2006-262896 A | 10/2006 |
| JP | 2007-289197 A | 11/2007 |
| WO | WO-96/17521 A1 | 6/1996 |
| WO | WO-01/39613 A1 | 6/2001 |

OTHER PUBLICATIONS

Huntington College of Health Sicences—Literature Education Series on Dietary Supplements, "A Primer on Branched Chain Amino Acids," 2009, p. 1-6.*
Tamura et al., "An Enhancing Effect on the Saltiness of Sodium Chloride of Added Amino Acids and Their Esters", Agric. Biol. Chem, vol. 53, No. 6, pp. 1625-1633, 1989.
Harada et al., "L-Leucine no Enmi Zokyo Koka ni Tsuite", The Japanese Journal of taste and smell research, Dec. 2007, vol. 14, No. 3, pp. 441-442.
Tanizawa et al., "Consideration Regarding Taste Component of Yeast Essence", A Technical Journal on Food Chemistry and Chemicals, vol. 22, No. 9, (2006), pp. 86-90.
Brandsma., "Low salt high taste," Food Ingredients and analysis international, vol. 28, No. 3, (2006), pp. 14-15.
Fushimi et al., "Taste and Flavor Functions of High Nucleic Acid Yeast Extract VERTEX IG 20", A Technical Journal on Food Chemistry and Chemicals, vol. 24, No. 8, (2008), pp. 70-74.
Office Action based on Japanese Patent Application No. 2008-532514, mailed Oct. 21, 2008.
Supplementary European Search Report Application No. 08738927 dated Jan. 17, 2012.

* cited by examiner

*Primary Examiner* — Elizabeth Gwartney
(74) *Attorney, Agent, or Firm* — Birch. Stewart, Kolasch & Birch, LLP

(57) ABSTRACT

The present invention relates to a method for enhancing salty taste-like taste of food and drink, as well as providing a seasoning composition and a salty taste-like taste enhancer to be provided to the method. The present invention provides a seasoning composition including a 5'-ribonucleotide and a branched-chain amino acid; the seasoning composition and the salty taste-like taste enhancer containing 0.45 to 81 parts by weight of the branched-chain amino acid relative to 100 parts by weight of the 5'-ribonucleotide; and a method for enhancing salty taste-like taste of food and drink containing 2 to 90 parts by weight of the 5'-ribonucleotide and 0.05 to 9 parts by weight of the branched-chain amino acid.

8 Claims, No Drawings

SEASONING COMPOSITIONS, SALT-LIKE TASTE ENHANCER AND METHOD FOR ENHANCING SALT-LIKE TASTE OF FOOD AND DRINK

TECHNICAL FIELD

The present invention relates to a method of enhancing a salt-like taste of food or drink including salt; a seasoning composition and a salt-like taste enhancer to be provided to the method; the food or drink produced with the use of the method as well as the food or drink produced with the use of the seasoning composition or the salt-like taste enhancer.

Priority is claimed on Japanese Patent Application No. 2007-101965, filed on Apr. 9, 2007, the content of which is incorporated herein by the reference.

BACKGROUND ART

It is generally believed that human beings distinguish five tastes: sweetness, saltiness, sourness, bitterness and umami (savoriness), these tastes are called the five basic tastes. The taste of each food or drink is determined by a complex combination of the five basic tastes. Salt (sodium chloride) is not only a necessary component of life activity, but also a main component in producing a salty taste. Consequently, the amount of salt content in food or drink is an important factor for controlling the taste of food or drink. While, overconsumption of salt is regarded as one of the factors to cause adult disease such as high blood pressure, heart diseases and the like, therefore, reduction of salt intake is strongly expected.

The easiest and simplest method to reduce the amount of salt content in food or drink is to simply reduce the amount of salt added, or to not add salt to food or drink. However, low sodium food or drink are remarkably lacking in taste Enhancing the flavor or smell of low sodium food or drink with sour, acrid taste, citrus flavors and the like is another method to reduce the salt content, however the later method is not preferred because the original taste or flavor of the food or drink is lost.

For the above reasons, a method to reduce the salt content in food or drink has been actively developed while maintaining the original good taste of the food or drink. For example, a method to replace a part or the whole salt content with potassium salt and the like is widely used in the medical food field as a method of adding material having a salt-like taste. Other than the above example, a method of adding a seasoning composition such as gluconate, demetallic salt including the lysine, ammonium chloride, monosodium L-aspartate, L-glutamate and a nucleic acid-based material mixed in a specific ratio have been disclosed (for example, refer to patent document 1 to 3).

Other than the above method of enhancing a salt-like taste, for example, a method for enhancing a salt-like taste of food or drink that is characterized by adding γ-aminobutyric acid and an organic acid and/or the salt to the food or drink has been disclosed (for example, refer to patent document 4). In addition, a method for enhancing a salt-like taste of food or drink that is characterized by adding an acidic amino acid, a basic amino acid and a succinic acid or salt to a food containing salt has been disclosed (for example, refer to patent document 5). Other than the above method, a method for enhancing a salt-like taste of food or drink by adding fat and oil that 70% or more in all fatty acid composition is oleic acid, a method of adding acid peptide or basic amino acid, a method of adding trehalose, a method of adding a specific protein hydrolysate, a method of adding a mixture of equal moles of arginine and asparagine acid, a method of adding a specific saturated aliphatic monocarboxylic acid, a method of adding thaumatin, a method of adding a specific collagen hydrolysate and the like have been disclosed (for example, refer to patent documents 6 to 13).

[Patent Document 1] International Publication No. 96/17521
[Patent Document 2] Japanese Unexamined Patent Application, First Publication No. Hei 06-87805
[Patent Document 3] Japanese Unexamined Patent Application, First Publication No. Hei 11-187841
[Patent Document 4] Japanese Laid-Open Patent Application No. 2004-275059
[Patent Document 5] Japanese Laid-Open Patent Application No. 2002-345430
[Patent Document 6] Japanese Laid-Open Patent Application No. 2006-262896
[Patent Document 7] International Publication No. 2001/039613
[Patent Document 8] Japanese Unexamined Patent Application, First Publication No. Hei 10-66540
[Patent Document 9] Japanese Unexamined Patent Application, First Publication No. Hei 7-289197
[Patent Document 10] U.S. Pat. No. 5,145,707
[Patent Document 11] Japanese Unexamined Patent Application, First Publication No. Hei 05-184326
[Patent Document 12] Japanese Unexamined Patent Application, First Publication No. Sho 63-137658
[Patent Document 13] Japanese Unexamined Patent Application, First Publication No Sho 63-3766

DISCLOSURE OF THE INVENTION

Problems to be Solved by the Invention

Although the saltiness of potassium salt and the like is quite different from the saltiness of salt, and it is not enough to satisfy in the meaning to make up for a good taste of food or drink. In addition, overconsumption of potassium may be high risk for a patient having kidney problems and the like.

While the additives and the like described in Patent Documents 4 to 13 may enhance saltiness, the effect of enhancing the saltiness using the additives is not sufficient. Furthermore, safety and economic aspects have been problems in adding the additives to food or drink.

The present invention relates to a method for enhancing the salt-like taste of food or drink safely as well as cheaply while maintaining the original good taste of food or drink, and a seasoning composition and a salt-like taste enhancer to be provided in the method.

Means for Solving the Problems

As a result of conducting extensive studies to solve the above problems, the inventors of the present invention have found that a composition having a mixture of a 5'-ribonucleotide and a branched amino acid in a specific ratio is able to enhance a salt-like taste.

In other words, the present invention provides a seasoning composition including a 5'-ribonucleotide and a branched-chain amino acid, wherein 0.45 to 81 parts by weight of the branched-chain amino acid relative to 100 parts by weight of the 5'-ribonucleotide are mixed in the seasoning composition.

In addition, the present invention provides a salt-like taste enhancer including a 5'-ribonucleotide and a branched-chain amino acid, wherein 0.45 to 81 parts by weight of the branched-chain amino acid relative to 100 parts by weight of the 5'-ribonucleotide are mixed in the salt-like taste enhancer.

Furthermore, the present invention provides a method for enhancing the salt-like taste of food or drink mixing 2 to 90 parts by weight of the 5'-ribonucleotide with 0.05 to 9 parts by weight of the branched-chain amino acid relative to 100 parts by weight of salt included in the food or drink.

In addition, the present invention provides the method for enhancing the salt-like taste of the food or drink according to the previously-described method, wherein at least one element selected from the group consisting of a yeast extract, a nucleic acid-based seasoning, and an amino acid-based seasoning is used as a raw material for the 5'-ribonucleotide and the branched-chain amino acid.

In addition, the present invention provides a method for enhancing the salt-like taste of food or drink using the previously-described seasoning composition or the previously-described salt-like taste enhancer.

Furthermore, the present invention provides food or drink product produced by using the method for enhancing salt-like taste of the food or drink of previously-described any one of the above description.

In addition, the present invention provides food or drink product produced by using the previously-described seasoning composition or the previously-described salt-like taste enhancer.

Effect of the Invention

A seasoning composition and a salt-like taste enhancer as well as a method for enhancing salt-like taste are able to enhance the salt-like taste while maintaining the original good taste of food or drink. Since a 5'-nucleotide and a branched-chain amino acid are usually used for food or drink, it is possible to enhance the salt-like taste of the food or drink more safely and cheaply than ever before.

BEST MODE FOR CARRYING OUT THE INVENTION

The salt-like taste of the present invention resembles a saltiness in quality, although the salt-like taste of the present invention is different from the salty taste defined in the five basic tastes. Generally, when a taste substance is orally-ingested, a precursor taste substance of the taste substance having a maximum taste value just after oral injection can be calculated by a taste curve plotted from horizontal axis which represents a time to sense the taste and vertical axis which represents strength of the taste. Salt which has saltiness is categorized into a typical precursor taste substance. The salt-like taste of the present invention resembles a salty taste in quality, although the salt-like taste is a non-precursor taste which has a maximum taste value in the last half of the taste curve.

A 5'-ribonucleotide of the present invention implies a nucleic acid-based seasoning having an umami (savory) taste. As the 5'-ribonucleotide, a 5'-inosinic acid, a 5'-guanylic acid, a 5'-adenyl acid, a 5'-uracil acid, a 5'-cytidylic acid, the metal salts and the like may be used. In addition, the origin of the 5'-ribonucleotide is not limited in particular. The 5'-ribonucleotide may be a synthetic compound, or may be a natural product. The synthetic compounds of food additives such as a nucleic acid-based seasoning of a 5'-inosinic acid disodium or a 5'-guanylic acid disodium or the like may be used. The natural product, for example, yeast extract, bonito essence, shiitake mushroom essence and the like, may be used. The yeast extract is particularly preferable due to a large content of 5'-ribonucleotide, and easy refinement and low cost thereof.

Generally, low sodium food or reduced salt food refers to food that has a reduced sodium content. From the point of reducing the amount of sodium in food or drink, the 5'-ribonucleotide of the present invention is preferably a metal salt other than sodium salt, such as a calcium salt or the like. However, even if it is a sodium salt, the ratio of the sodium of 5'-inosinic acid disodium or 5'-guanylic acid disodium is about 11% whereas the ratio of the sodium in salt is about 40%. In addition, the additive amount itself of 5'-inosinic acid disodium is reduced by the salt-like taste enhancer effect. For the above reasons, the reduction effect of salt is provided by using sodium salt such as 5'-inosinic acid disodium as the 5'-ribonucleotide of the present invention.

A branched-chain amino acid of the present invention is a hydrophobic amino acid, and a nonpolar side chain of the amino acid is branched. For example, valine, leucine, isoleucine and the like may be used. The origin of the branched-chain amino acid is not limited in particular. A synthesized or naturally produced branched-chain amino acid may be used. As naturally produced branched-chain amino acids, for example, a yeast extract, a protein hydrolysate, a fermented seasoning and the like may be used. These naturally produced branched-chain amino acid contain abundant amounts of other amino acids and can provide a complex flavor and a rich taste food or drink without breaking the flavor balance. Therefore, a naturally produced branched-chain amino acid is preferably used and the yeast extract which contains a large amount of free branched-chain amino acid is particularly preferable.

In addition, the branched-chain amino acid used for the present invention may be one kind of amino acid, or may be a mixture of an amino acid of two or more kinds of such as yeast extract and the like. For examples, valine, leucine or isoleucine may be used alone, or may be used in a mixture. When one kind of branched-chain amino acid is used alone, among valine, leucine or isoleucine, valine tends to show the most salt-like taste enhancing effect of food or drink of the present invention, and leucine tends to show the second most salt-like taste enhancing effect.

A method for enhancing the salt-like taste of food or drink of the present invention is characterized by mixing 2 to 90 parts by weight of a 5'-ribonucleotide and 0.05 to 9 parts by weight of a branched-chain amino acid relative to 100 parts by weight of salt included in the food or drink. The ratio of the 5'-ribonucleotide is preferably 5 to 50 parts by weight, the ratio of the branched-chain amino acid is preferably 0.1 to 7 parts by weight and more preferably 0.1 to 3.3 parts by weight. If the ratio of the 5'-ribonucleotide relative to 100 parts by weight of salt is less than 2 parts by weight, the effect of salt-like taste would not be recognized sensually. If the ratio of the 5'-ribonucleotide relative to 100 parts by weight of salt exceeds 90 parts by weight, the umami (savory) taste of the 5'-ribonucleotide becomes strong and enhancement of the salt-like taste would not be achieved. If the ratio of the branched-chain amino acid relative to 100 parts by weight of salt is less than 0.05 parts by weight, the salt-like taste could not be recognized sensually. If the ratio of the branched-chain amino acid relative to 100 parts by weight of salt exceeds 9 parts by weight, the original bitter taste of the branched-chain amino acid becomes strong and enhancement of the salt-like taste could not be achieved. Adding the 5'-ribonucleotide and the branched-chain amino acid to salt in the ratio described above will lead to enhancement of the salt-like taste of food or drink. In addition, the method of enhancing the salt-like taste of the present invention is different from the method of enhancing salt-like taste of adding additives of different flavors that are not originally contained in food or drink. On top of maintaining the flavor balance relative to the saltiness of food or drink by a method of enhancing the salt-like taste of the present invention, the salt content will be reduced because the 5'-ribonucleotide and the branched-chain amino acid are usually contained in food or drink.

For example, the salt content of food or drink such as noodle broth or ramen noodle soup is generally 0.9 to 1.5% by weight, and usually, a nucleic acid-based seasoning such as a 5'-inosinic acid disodium or a 5'-guanyic acid disodium is used. Then, salt, a 5'-ribonucleotide and a branched-chain amino acid contained in food or drink are provided in an appropriate component ratio by adding the branched-chain amino acid such as an amino acid-based seasoning and the like or the 5'-ribonucleotide such as a nucleic acid-based seasoning and the like for convenience to the food or drink, resulting in a reduction of salt, in other words, salt-like taste can be provided even if a reduction in the sodium content is provided. A part or whole of a 5'-inosinic acid disodium or a 5'-guanyic acid disodium of food or drink may be replaced by a 5'-ribonucleotide of a metal salt other than a sodium salt. In addition, when 100 parts by weight of salt is contained in food or drink, 2 to 90 parts by weight of a 5'-ribonucleotide may be contained therein and 0.05 to 9 parts by weight of a branched-chain amino acid may be contained therein by adding a yeast extract, for convenience since the yeast extract contains a large amount of either the 5'-ribonucleotide or a free branched-chain amino acid.

Food or drink to be used of the method for enhancing the salt-like taste of the present invention are not limited in particular as long as the food or drink contain salt. In the method of the present invention is preferably used in seasoned and processed food products such as noodle broth, ramen noodle soup, dip sauce, sauce, dressing, soup and the like, processed food products of starch syrup product, ground meat products, processed vegetables and the like, processed food products of highly preservable products such as dried food and the like, snacks such as snacks made from rice, snacks and the like. In particular, in the method of the present invention is preferably used in pouch-packed food, prepared frozen food, instant food and the like that can be eaten or drunk after only simple cooking such as heating and the like, food or drink such as snacks, pastry food, cans food and the like that can be eaten or drunk without cooking, and seasonings at meals. In addition, the method of the present invention is also preferably used in low sodium food products and/or reduced salt food products.

Mixing 2 to 90 parts by weight of a 5'-ribonucleotide and 0.05 to 9 parts by weight of a branched-chain amino acid relative to 100 parts by weight of salt containing in the food or drink is preferable when plural of processed food are added and mixed to serve as a processed food product. For examples, in the case of instant food containing fried noodles and seasonings for a soup, when 100 parts by weight of whole salt contained in the dried noodle and the seasonings for the soup, 2 to 90 parts by weight of the whole a 5'-ribonucleotide contained in the fried noodles and in the seasonings for the soup and 0.05 to 9 parts by weight of the whole branched-chain amino acid contained in the fried noodles and in the seasonings for the soup would be able to enhance the salt-like taste so that the salt content would be reduced while maintaining the original good taste of the instant food.

A seasoning composition and a salt-like taste enhancer of the present invention having a 5'-ribonucleotide and a branched-chain amino acid, and 0.45 to 81 parts by weight of the branched-chain amino acid relative to 100 parts by weight of the 5'-ribonucleotide are mixed in the seasoning composition. The amount of the branched-chain amino acid is preferably 1 to 63 parts by weight, and more preferably 1 to 30 parts by weight. If the ratio of the branched-chain amino acid relative to 100 parts by weight of the 5'-ribonucleotide is less than 0.45 parts by weight, the effect of the salt-like taste cannot be recognized sensually. If the amount of the branched-chain amino acid relative to 100 parts by weight of the 5'-ribonucleotide exceeds 81 parts by weight, the bitter taste which the branched-chain amino acid originally has becomes strong. Therefore, the above ranges are not preferable.

When 100 parts by weight of salt is contained in the food or drink, 2 to 90 parts by weight of a 5'-ribonucleotide and 0.05 to 9 parts by weight of a branched-chain amino acid can be easily achieved by adding a seasoning composition and a salt-like taste enhancer of the present invention to food or drink.

EXAMPLES

The present invention will be described in further detail using Examples below. However, the present invention is not limited to the following Examples.

Example 1

Comparative discussion about salt-like taste prepared by mixing 5'-ribonucleotides and a branched-chain amino acids in a 0.9% by weight (hereinafter, % by weight is simply shown as %) saline solution was conducted by three expert panelists. A 5'-ribonucleotide solution prepared by mixing equal amounts of a 5'-inosinic acid disodium (produced by Wako Pure Chemical Industries, Ltd., Special grade) and a 5'-guanylic acid disodium (produced by Wako Pure Chemical Industries, Ltd., Special grade) as the 5'-ribonucleotide was used. In addition, a branched-chain amino acid solution prepared by mixing equal amount of valine (produced by Wako Pure Chemical Industries, Ltd., Special grade) leucine (produced by Wako Pure Chemical Industries, Ltd., Special grade) and isoleucine (produced by Wako Pure Chemical Industries, Ltd., Special Ltd., Special grade) and isoleucine (produced by Wako Pure Chemical Industries, Ltd., Special grade) as the branched-chain amino acid was used.

In particular, 0.9% saline solution containing a 5'-ribonucleotide and a branched-chain amino acid was prepared by mixing the amount of the 5'-ribonucleotide and the branched-chain amino acid described in Table 1 and Table 2. In addition, "Ratio relative to salt" in the Tables indicates parts by weight of the 5'-ribonucleotide or the branched-chain amino acid relative to 100 parts by weight of salt, and "Ratio relative to 5'-ribonucleotide" indicates parts by weight of the branched-chain amino acid relative to 100 parts by weight of the 5'-ribonucleotides. In addition, in sensory comparison of the 5'-ribonucleotide and the branched-chain amino acid with a 0.9% saline solution containing salt only, a salt-like taste of the 0.9% saline solution containing the 5'-ribonucleotide and the branched-chain amino acid is apparently stronger than the 0.9% saline solution containing only salt was evaluated as O, slightly stronger as Δ, no difference as x.

TABLE 1

| Salt Concentration (%) | 5'-ribonucleotides | | Branched chain amino acid | | Ratio relative to 5'-ribonucleotides | Sensory comparison with 0.9% saline solution |
|---|---|---|---|---|---|---|
| | Concentration (%) | Ratio relative to salt | Concentration (%) | Ratio relative to salt | | |
| 0.9 | 1.5 | 166.7 | 0.01 | 1.1 | 0.7 | X |
| 0.9 | 0.81 | 90.0 | 0.01 | 1.1 | 1.2 | ○ |
| 0.9 | 0.45 | 50.0 | 0.01 | 1.1 | 2.2 | ○ |
| 0.9 | 0.2 | 22.2 | 0.01 | 1.1 | 5.0 | ○ |
| 0.9 | 0.1 | 11.1 | 0.01 | 1.1 | 10.0 | ○ |
| 0.9 | 0.045 | 5.0 | 0.01 | 1.1 | 22.2 | ○ |
| 0.9 | 0.018 | 2.0 | 0.01 | 1.1 | 55.6 | ○ |
| 0.9 | 0.01 | 1.1 | 0.01 | 1.1 | 100.0 | X |
| 0.9 | 0.00 | 0.00 | 0.01 | 1.1 | — | X |

TABLE 2

| Salt Concentration (%) | 5'-ribonucleotides | | Branched chain amino acid | | Ratio relative to 5'-ribonucleotides | Sensory comparison with 0.9% saline solution |
|---|---|---|---|---|---|---|
| | Concentration (%) | Ratio relative to salt | Concentration (%) | Ratio relative to salt | | |
| 0.9 | 0.1 | 11.1 | 0.0 | 0.0 | 0.0 | X |
| 0.9 | 0.1 | 11.1 | 0.00028 | 0.03 | 0.28 | X |
| 0.9 | 0.1 | 11.1 | 0.00045 | 0.05 | 0.45 | Δ |
| 0.9 | 0.1 | 11.1 | 0.001 | 0.11 | 1.00 | ○ |
| 0.9 | 0.1 | 11.1 | 0.0045 | 0.5 | 4.50 | ○ |
| 0.9 | 0.1 | 11.1 | 0.01 | 1.1 | 10.00 | ○ |
| 0.9 | 0.1 | 11.1 | 0.03 | 3.3 | 30.00 | ○ |
| 0.9 | 0.1 | 11.1 | 0.063 | 7.0 | 63.00 | ○ |
| 0.9 | 0.1 | 11.1 | 0.081 | 9.0 | 81.00 | Δ |
| 0.9 | 0.1 | 11.1 | 0.1 | 11.1 | 100.00 | X |

According to the result of Table 1, in the case where the concentrations of the 5'-ribonucleotide were changed while the concentration of the branched-chain amino acid was set to 0.01%, in other words, in the case where the weight of the branched-chain amino acid was set to 1.1 parts by weight relative to 100 parts by weight of salt, the salt-like taste was stronger than the 0.9% saline solution containing salt only when the 5'-ribonucleotide was 2 to 90 parts by weight relative to 100 parts by weight of salt. In addition, the result apparently indicated that salty taste-like taste was particularly strong when the 5'-ribonucleotide was 5 to 50 parts by weight. Note that, in the above case, a ratio of the branched-chain amino acid was 1.2 to 56 parts by weight relative to 100 parts by weight of the 5'-ribonucleotide.

In addition, according to the result of Table 2, in the case where the concentrations of the branched-chain amino acid were changed while the concentration of the 5'-ribonucleotide was set to 0.1%, in other words, in the case where the weight of the 5'-ribonucleotide was set to 11.1 parts by weight relative to 100 parts by weight of salt, the salt-like taste was stronger than the 0.9% saline solution containing salt only when the branched-chain amino acid was 0.05 to 9 parts by weight relative to 100 parts by weight of salt. The salt-like taste was much stronger when the branched-chain amino acid was 0.1 to 7 parts by weight, and much more stronger when the branched-chain amino acid was 0.1 to 3.3 parts by weight. Note that, in the above case, the ratio of the branched-chain amino acid was 0.45 to 81 parts by weight relative to 100 parts by weight of the 5'-ribonucleotide.

In addition, the panelists commented that a 0.9% saline solution containing an appropriate ratio by weight of a 5'-ribonucleotide and a branched-chain amino acid was different from the saltiness of the 0.9% saline solution containing salt only such that the panelists felt there was a saltiness aftertaste, and there was also a strong saltiness.

More specifically, it is apparent to enhance the salt-like taste of food or drink by mixing 2 to 90 parts by weight of the 5'-ribonucleotide and 0.05 to 9 parts by weight of the branched-chain amino acid relative to 100 parts by weight of salt contained in food or drink. In addition, enhancing the salt-like taste of food or drink by using a seasoning composition or a salt-like taste enhancer which is a composition containing a 5'-ribonucleotide and a branched-chain amino acid and also containing 0.45 to 81 parts by weight of the branched-chain amino acid relative to 100 parts by weight of the 5'-ribonucleotide.

Example 2

A 0.9% saline solution containing a 5'-ribonucleotide and a branched-chain amino acid described in Table 3 was obtained by the same method as that used in Example 1 except for using a nucleic acid-based seasoning Gimp (produced by Japan Tobacco Inc.) as a 5'-ribonucleotide solution and a leucine solution as a branched-chain amino acid solution. Three expert panelists ranked three kinds of obtained 0.9% saline solution containing the 5'-ribonucleotide and the branched-chain amino acid in order from the strongest to the weakest salt-like taste. Sample 3 had a much stronger taste than sample 1 and 2, and left a salty taste aftertaste. Therefore, the sample 3 was evaluated to have a strong salt-like taste. While, there was not much difference in the salt-like taste of the sample 1 and 2.

As a result, the effect of enhancing a salt-like taste by containing 1.11 parts by weight of the branched-chain amino acid, even leucine used alone, relative to 100 parts by weight of salt, and 10 parts by weight of the branched-chain amino acid relative to 100 parts by weight of the 5'-ribonucleotides has been revealed. In addition, even if each of valine alone, isoleucine alone, valine and isoleucine, valine and leucine, leucine and isoleucine were used, the same results would be obtained. Therefore, the branched-chain amino acid can apparently bring the same effect even if the branched-chain amino acids were all mixed, combined or used alone.

TABLE 3

|  | Salt Concentration (%) | GImp | | Leucine | | |
|---|---|---|---|---|---|---|
|  |  | Concentration (%) | Ratio relative to salt | Concentration (%) | Ratio relative to salt | Ratio relative to GImp |
| Sample 1 | 0.9 | 0.1 | 11.1 | 0.0001 | 0.011 | 0.1 |
| Sample 2 | 0.9 | 0.1 | 11.1 | 0.1 | 11.1 | 100 |
| Sample 3 | 0.9 | 0.1 | 11.1 | 0.01 | 1.1 | 10 |

Example 3

A 0.9% saline solution containing a 5'-ribonucleotide and a branched-chain amino acid of mixing compositions described in Table 4 was prepared by the same method as used in Example 1. In addition, as Comparative Examples, concentration gradient solutions from 0.5 to 1.5% of a saline solution by 0.1% were prepared. Three expert panelists sensory evaluated that which saline solution in the concentration gradient is equivalent to the salty taste of the prepared 0.9% saline solution containing the 5'-ribonucleotide and the branched-chain amino acid. The result of the sensory evaluation is shown in Table 4. In Table, "enhancement effect" indicates the ratio of salty taste concentration sensed to the actual salt. According to the result, approximately 20% of salt-like taste enhancement effect was obtained by adding a suitable amount of the 5'-ribonucleotide and the branched-chain amino acid in 0.5 to 1.1% salt concentration.

TABLE 4

| 5'-ribonucleotides concentration (%) | 0.1 | 0.1 | 0.1 | 0.1 | 0.1 |
|---|---|---|---|---|---|
| Branched chain amino acid (%) | 0.01 | 0.01 | 0.01 | 0.01 | 0.01 |
| Salt concentration (%) | 0.5 | 0.7 | 0.9 | 1.1 | 1.3 |
| Salt concentration of salty taste equivalent to in sensuality (%) | 0.6 | 0.9 | 1.1 | 1.3 | 1.5 |
| Enhancement effect (%) | 120.0 | 128.6 | 122.2 | 118.2 | 115.4 |

Example 4

First, a saline solution 1 containing a 1.5% salt concentration and 0.5% yeast extract 21A (produced by Japan Tobacco Inc.) was prepared. The total salt content, the total 5'-ribonucleotide and the total branched-chain amino acid in the saline solution 1 were 1.5%, 0.003% and 0.025%, respectively. Therefore, 0.2 parts by weight of the 5'-ribonucleotide and 1.67 parts by weight of the branched-chain amino acid relative to 100 parts by weight of salt were contained in the saline solution 1 and 833.3 parts by weight of the branched-chain amino acid relative to 100 parts by weight of the 5'-ribonucleotide was contained in the saline solution 1.

Next, a saline solution 2 containing 1.5% of salt concentration, 0.5% of a yeast extract 21A and 0.1% of a GImp was prepared. The total salt content, the total 5'-ribonucleotide and the total branched-chain amino acid in the saline solution 2 were 1.5%, 0.103% and 0.025%, respectively. Therefore, 6.87 parts by weight of the 5'-ribonucleotide and 1.67 parts by weight of the branched-chain amino acid relative to 100 parts by weight of salt were contained in the saline solution 2, and 24.27 parts by weight of the branched-chain amino acid relative to 100 parts by weight of the 5'-ribonucleotide was contained in the saline solution 2.

Eight expert panelists evaluated which salt-like taste is stronger between the two kinds of the obtained saline solutions. According to the result, seven out of eight panelists evaluated the saline solution 2 as having a stronger salty taste.

Note that, one expert panelist evaluated that either the salty taste of the saline solutions did not have a difference. According to the result of Example 4, salt-like taste of food or drink could be enhanced by mixing 2 to 90 parts by weight of the 5'-ribonucleotide and 0.05 to 9 parts by weight of the branched-chain amino acid relative to 100 parts by weight of salt contained in the food or drink with the use of the yeast extract or the nucleic acid-based seasoning.

Example 5

First, a salt-like taste enhancer 1 containing 10 parts by weight of the branched-chain amino acid relative to 100 parts by weight of a nucleic acid-based seasoning GImp with the use of the branched-chain amino acid solution used in Example 1 was prepared.

Next, an oden soup 2 was prepared by adding the salt-like taste enhancer 1 to an oden soup 1 consisting of the composition of Table 5 to prepare 0.11% of the oden soup 2.

The total salt content, the total 5'-ribonucleotide and the total branched-chain amino acid in the oden soup 1 were 1.53%, 0.001% and 0.05%, respectively. Therefore, 0.07 parts by weight of 5'-ribonucleotide and 3.3 parts by weight of the branched-chain amino acid relative to 100 parts by weight of salt contained in the oden soup 1 were contained in the oden soup 1. Whereas, 6.6 parts by weight of the 5'-ribonucleotide and 3.9 parts by weight of the branched-chain amino acid relative to 100 parts by weight of salt were mixed in the oden soup 2 which the salt-like taste enhancer 1 was added to the oden soup 1.

TABLE 5

|  | Salt | 5'-ribonucleotide | Branched chain amino acid |
|---|---|---|---|
| Thin soy sauce | 5.30% | 0.85% |  | 0.05% |
| Sweet cooking rice wine | 3.30% |  |  |
| Sugar | 0.33% |  |  |

TABLE 5-continued

|  | Salt | 5'-ribonucleotide | Branched chain amino acid |
| --- | --- | --- | --- |
| Salt | 0.65% | 0.65% | |
| Bonito essence (produced by Japan Tobacco Inc.) | 0.30% | 0.003% | 0.001% |
| Water | 90.42% | | |
| Total | 100.00% | 1.53% | 0.001% | 0.05% |

Eight expert panelists ranked two kinds of the obtained oden soups in order from the strongest to the weakest salt-like taste. According to the result, seven out of the eight panelists evaluated that the oden soup 2 had the strongest salty taste. Note that, the one expert panelist evaluated that the salty taste of the both oden soups did not have a difference.

That is, according to the result of Example 5, the salt-like taste of food or drink could be enhanced by mixing 2 to 90 parts by weight of the 5'-ribonucleotide and 0.05 to 9 parts by weight of the branched-chain amino acid relative to 100 parts by weight of salt containing food or drink by adding the seasoning composition or the salt-like taste enhancer containing 0.45 to 81 parts by weight of the branched-chain amino acid relative to 100 parts by weight of 5'-ribonucleotide in the food or drink.

Example 6

First, a ramen soup 2 which had an adjusted salt content to 1% by reducing additive amount of salt, and by adding 0.5% by weight of a yeast extract vertex IG20 (produced by Japan Tobacco Inc.) to a ramen soup 1 described in Table 6 was prepared.

Note that, the total 5'-ribonucleotide content and the total branched-chain amino acid in the ramen soup1 was 0.003% and 0.034%, respectively. Therefore, 0.2 parts by weight of the 5'-ribonucleotide and 2.8 parts by weight of the branched-chain amino acid relative to 100 parts by weight of salt were contained. While, the total 5'-ribonucleotide content and the total branched-chain amino acid in the ramen soup 2 was 0.103% and 0.04%, respectively. Therefore, 10.3 parts by weight of the 5'-ribonucleotide and 4.0 parts by weight of the branched-chain amino acid relative to 100 parts by weight of salt were contained.

TABLE 6

|  | Ramen soup 1 | Ramen soup 2 |
| --- | --- | --- |
| Thick soy sauce | 3.76% | 3.76% |
| Bonito essence (produced by Japan Tobacco Inc.) | 0.50% | 0.50% |
| Seaweed essence (produced by Japan Tobacco Inc.) | 0.50% | 0.50% |
| Pork essence (produced by Japan Tobacco Inc.) | 0.30% | 0.30% |
| Chicken essence (produced by Japan Tobacco Inc.) | 0.10% | 0.10% |
| Salt | 0.50% | 0.23% |
| Garlic essence (produced by Nikken Foods, Co., Ltd.) | 0.01% | 0.01% |
| Onion essence (produced by Nikken Foods, Co., Ltd.) | 0.01% | 0.01% |
| White pepper | 0.01% | 0.01% |
| Water | 94.32% | 94.09% |
| Vertex IG20 (produced by Japan Tobacco Inc.) | | 0.5% |
| Total | 100% | 100% |
| Salt content | 1.20% | 1.0% |

Nine expert panelists compared the strength of the salt-like taste of ramen soup 1 and ramen soup 2. Four out of nine panelists answered that the ramen soup 1 was much more salty. While, five out of nine panelists answered that the ramen soup 2 was much more salty. More specifically, there was no significant difference in salty taste between ramen soup 1 and 2. The total salt content of the ramen soup 1 was 1.2% and the total salt content of the ramen soup 2 was 1.0%. More specifically, according to the result of Example 6, approximately 20% of the salt could have been eliminated without losing the original taste of the ramen soup 1, because salt-like taste had been enhanced by adding a yeast extract to the ramen soup 1.

Example 7

A 0.9% of saline solution containing a 5'-ribonucleotide and a branched-chain amino acid described in Table 7 to 9 was obtained by the same method as used in Example 1 except for using a nucleic acid-based seasoning Gimp (produced by Japan Tobacco Inc.) as a 5'-ribonucleotide solution and each amino acid solution such as leucine, valine and isoleucine as a branched-chain amino acid solution. Five expert panelists performed sensory comparisons with 0.9% saline solution by the same method used in Example 1. When the salt-like taste of the 0.9% saline solution containing a 5'-ribonucleotide and a branched-chain amino acid is apparently stronger than the 0.9% saline solution containing only salt was evaluated as O, slightly stronger as Δ and no difference as x.

According to the results, sample 3, 10 and 17 had a strong salt-like taste than the 0.9% saline solution containing only salt. The samples 3, 10 and 17 had 2 to 90 parts by weight of the 5'-ribonucleotide and 0.05 to 9 parts by weight of the branched-chain amino acid relative to 100 parts by weight of salt contained in the saline solution as well as 0.45 to 81 parts by weight of the branched-chain amino acid relative to the 5'-ribonucleotide, even if the branched-chain amino acids were any of leucine, valine and isoleucine.

TABLE 7

|  | GImp | | Leucine | | | |
| --- | --- | --- | --- | --- | --- | --- |
|  | Salt Concentration (%) | Concentration (%) | Ratio relative to salt | Concentration (%) | Ratio relative to salt | Ratio relative to GImp | Sensory comparison with 0.9% saline solution containing only salt |
| Sample 1 | 0.9 | 0.1 | 11.1 | 0.0 | 0.0 | 0.0 | X |
| Sample 2 | 0.9 | 0.1 | 11.1 | 0.0001 | 0.0 | 0.1 | X |
| Sample 3 | 0.9 | 0.1 | 11.1 | 0.01 | 1.1 | 10 | ○ |
| Sample 4 | 0.9 | 0.1 | 11.1 | 0.1 | 11.1 | 100 | X |

TABLE 7-continued

|  |  | GImp | | Leucine | | | |
| --- | --- | --- | --- | --- | --- | --- | --- |
|  | Salt Concentration (%) | Concentration (%) | Ratio relative to salt | Concentration (%) | Ratio relative to salt | Ratio relative to GImp | Sensory comparison with 0.9% saline solution containing only salt |
| Sample 5 | 0.9 | 0.01 | 1.1 | 0.1 | 11.1 | 1000 | X |
| Sample 6 | 0.9 | 0.0001 | 0.01 | 0.1 | 11.1 | 100000 | X |
| Sample 7 | 0.9 | 0.0 | 0.0 | 0.1 | 11.1 |  | X |

TABLE 8

|  |  | GImp | | Valine | | | |
| --- | --- | --- | --- | --- | --- | --- | --- |
|  | Salt Concentration (%) | Concentration (%) | Ratio relative to salt | Concentration (%) | Ratio relative to salt | Ratio relative to GImp | Sensory comparison with 0.9% saline solution containing only salt |
| Sample 8 | 0.9 | 0.1 | 11.1 | 0.0 | 0.0 | 0.0 | X |
| Sample 9 | 0.9 | 0.1 | 11.1 | 0.0001 | 0.01 | 0.1 | X |
| Sample 10 | 0.9 | 0.1 | 11.1 | 0.01 | 1.1 | 10 | ○ |
| Sample 11 | 0.9 | 0.1 | 11.1 | 0.1 | 11.1 | 100 | X |
| Sample 12 | 0.9 | 0.01 | 1.1 | 0.1 | 11.1 | 1000 | X |
| Sample 13 | 0.9 | 0.0001 | 0.01 | 0.1 | 11.1 | 100000 | X |
| Sample 14 | 0.9 | 0.0 | 0.0 | 0.1 | 11.1 |  | X |

TABLE 9

|  |  | GImp | | Isoleucine | | | |
| --- | --- | --- | --- | --- | --- | --- | --- |
|  | Salt Concentration (%) | Concentration (%) | Ratio relative to salt | Concentration (%) | Ratio relative to salt | Ratio relative to GImp | Sensory comparison with 0.9% saline solution containing only salt |
| Sample 15 | 0.9 | 0.1 | 11.1 | 0.0 | 0.0 | 0.0 | X |
| Sample 16 | 0.9 | 0.1 | 11.1 | 0.0001 | 0.01 | 0.1 | X |
| Sample 17 | 0.9 | 0.1 | 11.1 | 0.01 | 1.1 | 10 | ○ |
| Sample 18 | 0.9 | 0.1 | 11.1 | 0.1 | 11.1 | 100 | X |
| Sample 19 | 0.9 | 0.01 | 1.1 | 0.1 | 11.1 | 1000 | X |
| Sample 20 | 0.9 | 0.0001 | 0.01 | 0.1 | 11.1 | 100000 | X |
| Sample 21 | 0.9 | 0.0 | 0.0 | 0.1 | 11.1 |  | X |

Next, five expert panelists ranked the sample 3, 10 and 17 in order from the strongest to the weakest salt-like taste to see a difference among the sample 3, 10 and 17.

According to the result, four panelists evaluated that the sample 10 as having the strongest salt-like taste, and one panelist evaluated the sample 3 as having the strongest salt-like taste. In addition, five out of five panelists evaluated the sample 17 as having the weakest salt-like taste.

Example 8

A cream soup 1 of general composition and a cream soup 2 in which the salt content of the cream soup 1 was reduced, a cream soup 3 which 2% by weight of a yeast extract vertex IG20 (produced by Japan Tobacco Inc.) and 2.6% by weight of Na$^+$ originated from FP powder adjusted by adding salt as well as reducing the salt content of the cream soup 1, was prepared. Note that, the FP powder is a self-digested seasoning made from fish proteins, and abundant branched-chain amino acid is included therein.

TABLE 10

|  | Cream soup 1 | Cream soup 2 | Cream soup 3 |
| --- | --- | --- | --- |
| Cream powder (produced by Wakodo Co. Ltd.) | 43.0% | 43.0% | 43.0% |
| Superfine sugar | 12.0% | 12.0% | 12.0% |
| Vegetable essence powder (Nikken foods Co., Ltd.) | 11.0% | 11.0% | 11.0% |
| Spice | 0.50% | 0.50% | 0.50% |
| Dextrine (Matsuya Chemical Industry Co., Ltd.) | 23.9% | 29.8% | 26.4% |
| Salt | 9.60% | 3.70% | 2.50% |
| Vertex IG20 (produced by Japan Tobacco Inc.) |  |  | 2.00% |
| FP powder (produced by Japan Tobacco Inc.) |  |  | 2.60% |
| Total | 100% | 100% | 100% |
| Salt content (mg/100 g) | 4560 | 2325 | 2325 |

Eight expert panelists performed a sensory evaluation of the above three cream soups by diluting the soups with hot water to 5% by weight. According to the results, three panelists answered that the cream soup 1 is preferable as a cream soup for a question which cream soup is preferable among the above three cream soups. Zero panelists answered that the cream soup 2 is preferable as a cream soup. Five panelists answered that the cream soup 3 is preferable as a cream soup. As the reason why any panelists did not choose the cream soup 2, six out of eight panelists answered that the salty taste of the cream soup 2 was weak, and did not have enough taste.

The $Na^+$ content of the cream soup 1 was 4,650 mg/100 g, and the $Na^+$ content of the cream soup 3 was 2,325 mg/100 g. According to the result, adding vertex IG20 and enhancing a branched-chain amino acid with FP powder, in other words, even though 50% of $Na^+$ is reduced with the use of the method for enhancing the salt-like taste of a food or drink, the cream soup 1 which had an enhanced salt-like taste did not reduce the $Na^+$ content and the personal preference for a cream soup was not significant.

In addition, 0.295% by weight of salt, 0.02% by weight of the 5'-ribonucleotide and 0.00181% by weight of the branched-chain amino acid were contained in the cream soup 3. In other words, when 100 parts by weight of salt was used, 6.8 parts by weight of the 5'-ribonucleotide and 0.6 parts by weight of the branched-chain amino acid were used. When vertex IG20 was added by itself to a cream soup, the branched-chain amino acid was 0.3 parts by weight, and almost double the amount of the branched-chain amino acids were enhanced with the use of the FP powder.

These results indicate that the enhancement effect of the salt-like taste can be further effective by enhancing not only a 5'-ribonucleotide but also a branched-chain amino acid.

INDUSTRIAL APPLICABILITY

A salt-like taste can be enhanced by the use of a seasoning composition and a salt-like taste enhancer, or a method of enhancing salt-like taste of food or drink of the present invention, while the original taste of food or drink can be maintained and the salt content of food or drink can be effectively reduced. Therefore, the present invention is available in the field of food or drink, and the like where reduction of salt content is expected.

The invention claimed is:

1. A method for enhancing salt-like taste of food or drink comprising:
adding a 5'-ribonucleotide and a branched-chain amino acid to food or drink so as to have 2 to 90 parts by weight of the 5'-ribonucleotide and 0.05 to 9 parts by weight of the branched-chain amino acid relative to 100 parts by weight of salt in the food or drink,
wherein the branched-chain amino acid is a mixture of equal amount of valine, leucine and isoleucine.

2. A method for enhancing salt-like taste of food or drink comprising:
adding a 5'-ribonucleotide and a branched-chain amino acid to food or drink so as to have 2 to 90 parts by weight of the 5'-ribonucleotide and 0.05 to 9 parts by weight of the branched-chain amino acid relative to 100 parts by weight of salt in the food or drink,
wherein the 5'-ribonucleotide and the branched-chain amino acid are in at least one element selected from the group consisting of a yeast extract, a nucleic acid-based seasoning, and an amino acid based seasoning, and
the branched-chain amino acid is a mixture of equal amount of valine, leucine and isoleucine.

3. A method for enhancing salt-like taste of food or drink comprising:
adding a composition comprising a 5'-ribonucleotide and a branched-chain amino acid to food or drink so as to have 2 to 90 parts by weight of the 5'-ribonucleotide and 0.05 to 9 parts by weight of the branched-chain amino acid relative to 100 parts by weight of salt in the food or drink,
wherein the branched-chain amino acid is a mixture of equal amount of valine, leucine and isoleucine.

4. A food or drink product produced by the method
adding 2 to 90 parts by weight of a 5'-ribonucleotide and 0.05 to 9 parts by weight of a branched-chain amino acid relative to 100 parts by weight of salt included in the food or drink to food or drink,
wherein the branched-chain amino acid is a mixture of equal amount of valine, leucine and isoleucine.

5. A method for enhancing salt-like taste of food or drink comprising:
adding a 5'-ribonucleotide and a branched-chain amino acid to food or drink so as to have 2 to 90 parts by weight of the 5'-ribonucleotide and 0.05 to 9 parts by weight of the branched-chain amino acid relative to 100 parts by weight of salt in the food or drink,
wherein the 5'-ribonucleotide is a mixture of equal amount of a 5'-inosinic acid disodium and a 5'-guanylic acid disodium.

6. A method for enhancing salt-like taste of food or drink comprising:
adding a 5'-ribonucleotide and a branched-chain amino acid to food or drink so as to have 2 to 90 parts by weight of the 5-ribonucleotide and 0.05 to 9 parts by weight of the branched-chain amino acid relative to 100 parts by weight of salt in the food or drink,
wherein the 5'-ribonucleotide and the branched-chain amino acid are in at least one element selected from the group consisting of a yeast extract, a nucleic acid-based seasoning, and an amino acid based seasoning, and
the 5'-ribonucleotide is a mixture of equal amount of a 5'-inosinic acid disodium and a 5'-guanylic acid disodium.

7. A method for enhancing salt-like taste of food or drink comprising:
adding a composition comprising a 5'-ribonucleotide and a branched-chain amino acid to the food or drink so as to have 2 to 90 parts by weight of the 5-ribonucleotide and 0.05 to 9 pans by weight of the branched-chain amino acid relative to 100 parts by weight of salt in the food or drink,
wherein the 5'-ribonucleotide is as mixture of equal amount of a 5'-inosinic acid disodium and a 5'-guanylic acid disodium.

8. A food or drink product produced by the method comprising:
adding 2 to 90 parts by weight of a 5'-ribonucleotide and 0.05 to 9 parts by weight of a branched-chain amino acid relative to 100 parts by weight of salt included in the food or drink to food or drink,
wherein the 5'-ribonucleotide is a mixture of equal amount of a 5'-inosinic acid disodium and a 5'-guanylic acid disodium.

* * * * *